No. 720,503. PATENTED FEB. 10, 1903.
R. J. THOMPSON.
POTATO DIGGER.
APPLICATION FILED MAR. 13, 1902.
NO MODEL. 4 SHEETS—SHEET 1.
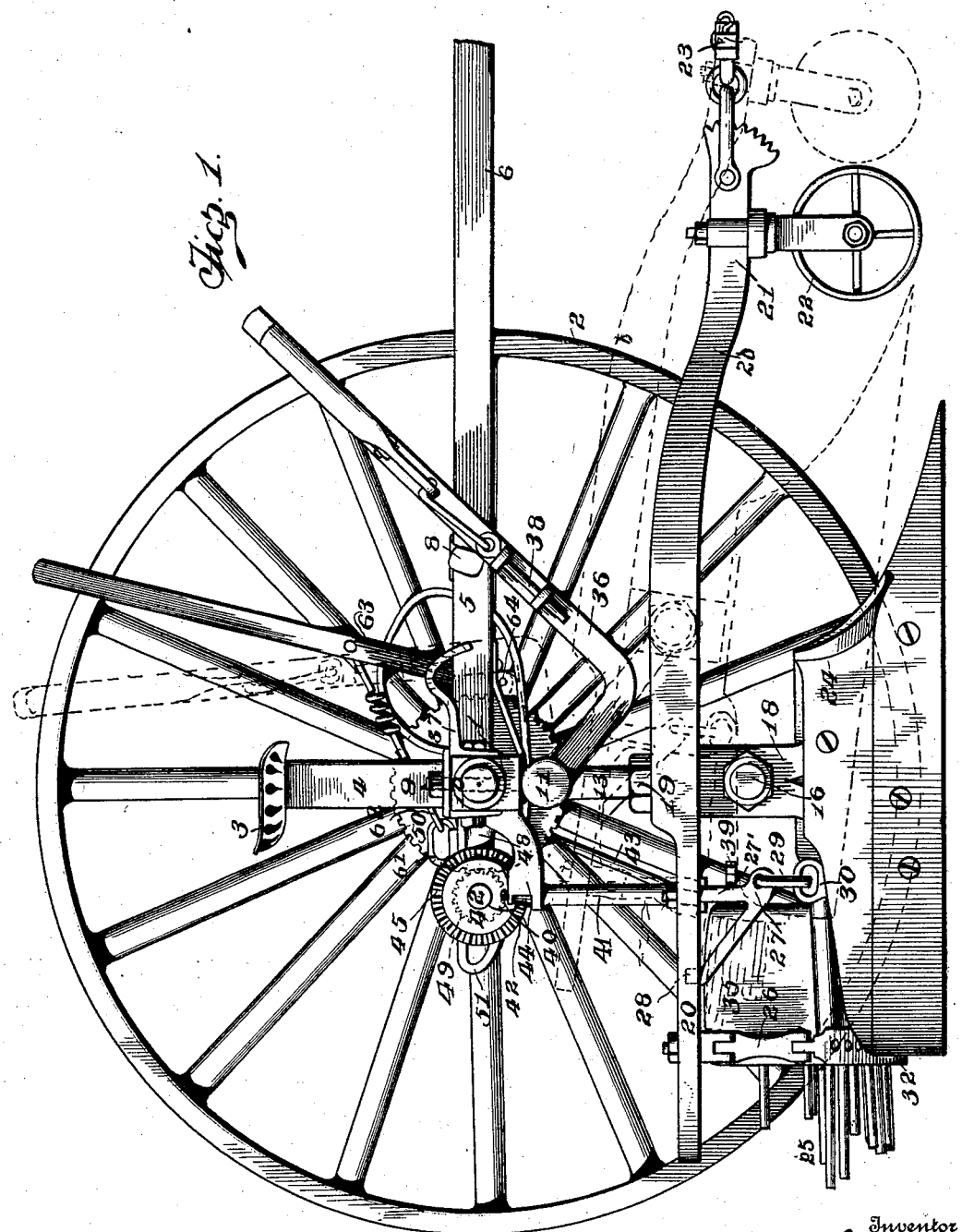
Witnesses
L. G. Handy
Edgar M. Kichin
Inventor
Robert J. Thompson
By his Attorneys

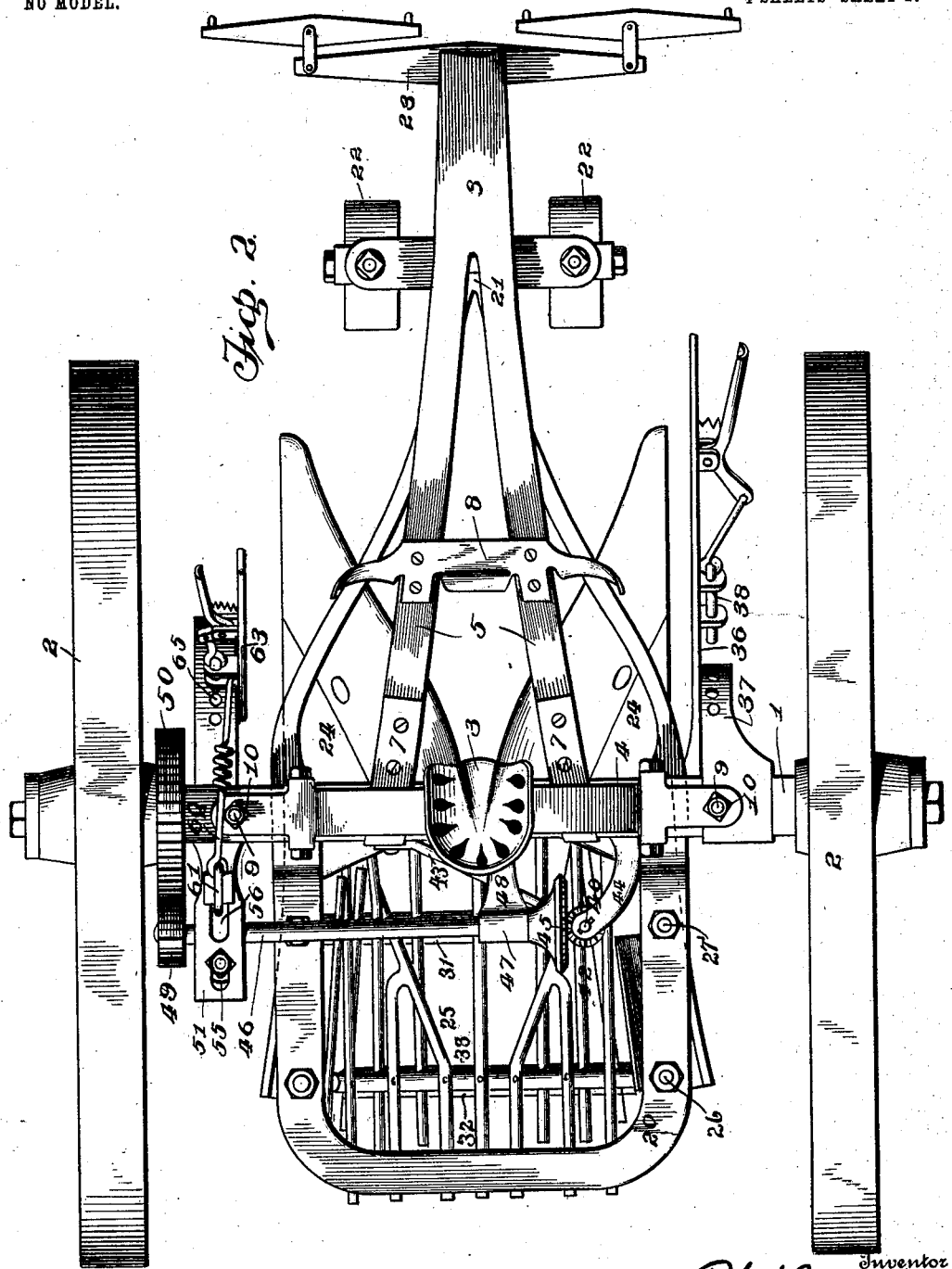

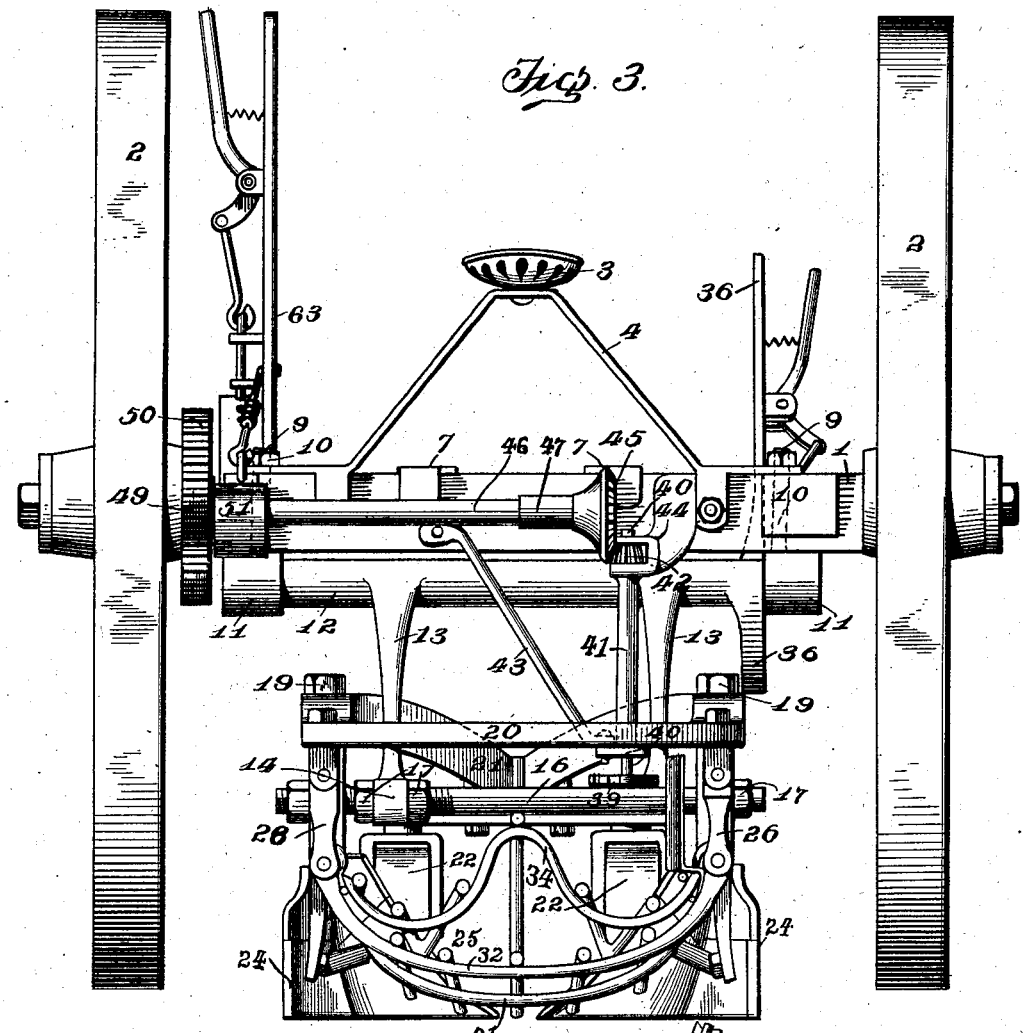
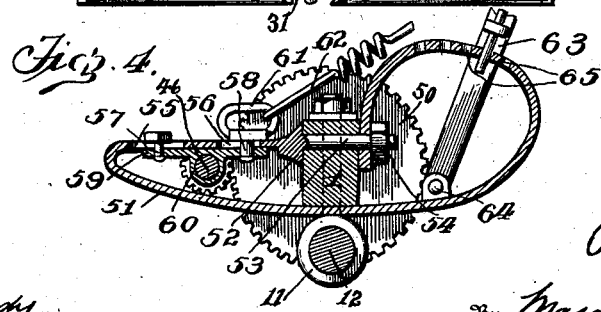

No. 720,503. PATENTED FEB. 10, 1903.
R. J. THOMPSON.
POTATO DIGGER.
APPLICATION FILED MAR. 13, 1902.
NO MODEL. 4 SHEETS—SHEET 4.
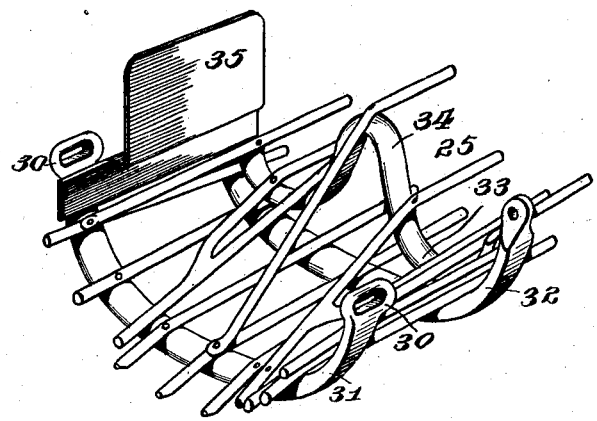
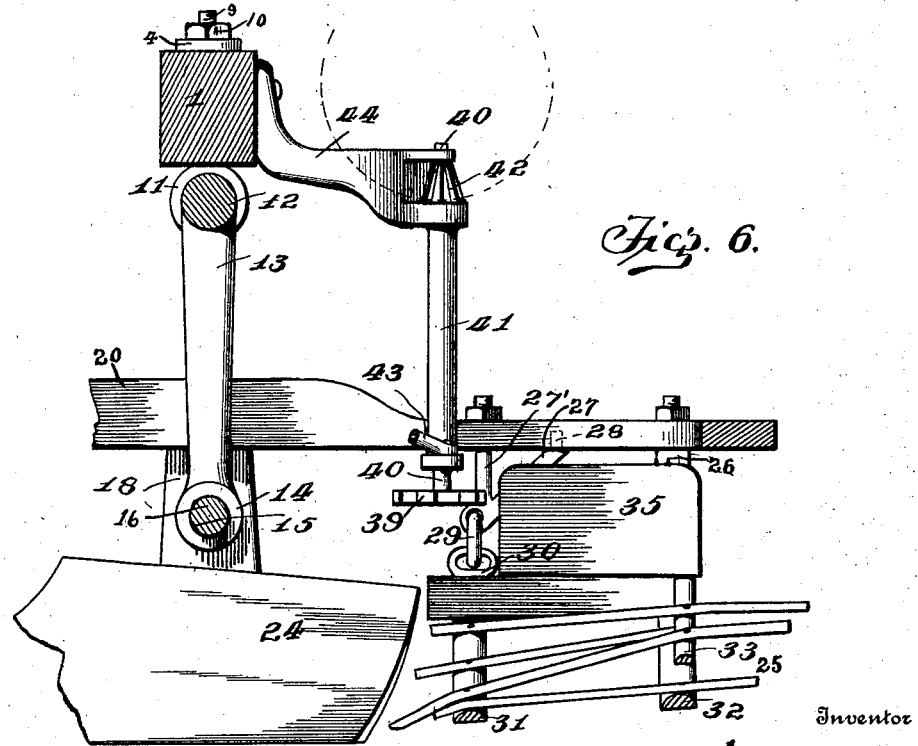
Witnesses
L. G. Handy
Edgar M Kitchin
Inventor
Robert J. Thompson
By
his Attorneys

UNITED STATES PATENT OFFICE.

ROBERT J. THOMPSON, OF STEVENS POINT, WISCONSIN.

POTATO-DIGGER.

SPECIFICATION forming part of Letters Patent No. 720,503, dated February 10, 1903.

Application filed March 13, 1902. Serial No. 98,105. (No model.)

*To all whom it may concern:*

Be it known that I, ROBERT J. THOMPSON, a citizen of the United States, residing at Stevens Point, in the county of Portage and State of Wisconsin, have invented certain new and useful Improvements in Potato-Diggers; and I do hereby declare the following to be a full, clear, and exact description of the invention such as will enable others skilled in the art to which it appertains to make and use the same.

This invention relates to improvements in potato-diggers, and more particularly to that class in which a plow is used for unearthing the potatoes and a suitable screen employed for separating the potatoes from their vines and from the loose earth about them.

The invention consists of suitable traction-wheels, a frame carried thereby, a plow carried by the frame, and a double screen carried by the frame at the rear of said plow, the lower portion of the screen being adapted to receive potatoes directed to the same by the said plow, while the soil surrounding the potatoes is permitted to fall through the screen back to the earth.

It also consists of a suitable frame, means for carrying the same, oppositely-disposed plows each adapted to throw a furrow toward the other, directing the dirt toward the rear, and a screen carried by said frame adapted to receive such soil and separate therefrom any comparatively large bodies carried therein.

It further consists of certain other novel constructions, combinations, and arrangements of parts, as will be hereinafter more fully described and particularly claimed.

In the accompanying drawings, Figure 1 represents a side elevation of a potato-digger embodying the features of the present invention, one traction-wheel being omitted to more fully disclose the parts, the plows and screen being shown in operative position in full lines and raised position in dotted lines. Fig. 2 represents a top plan view of the same. Fig. 3 represents a rear elevation of the same. Fig. 4 represents an enlarged detail section of the stirrer-controlling mechanism, the operating-gear being shown in elevation. Fig. 5 represents a detail perspective view of the double screen, the attaching means thereof being removed; and Fig. 6 represents a vertical longitudinal section through the rear half of the present potato-digger, the traction-wheels being omitted.

In carrying out my present invention I provide a suitable axle, as 1, carrying at its ends any desired form of wheels 2 2 and intermediate of its length a suitable seat, as 3, supported by any desired form of spring, as 4, which spring is secured in any suitable and preferred manner to the said axle. Between the ends of spring 4 is secured the bifurcated end 5 of any preferred form of pole 6, the said bifurcated portion being preferably passed through the axle and secured thereto by suitable clamps, as 7 7. Any form of foot-rest, as 8, may be secured to the said pole at any desired point of its length.

Bolts, as 9, are passed through axle 1 at a point near each of said wheels 2, and each bolt carries at its upper end a suitable nut, as 10, and its lower end is formed with a suitable head, as 11, apertured to provide a bearing for the opposite ends of a suitably-journaled shaft, as 12, which is free to rotate within said aperture, but prevented from removal by the rigidity of the bolts 9 in their position in the axle 1. Formed integral with and extending downward from said shaft 12 are any preferred number of suitable arms, as 13 13, which arms are formed with suitable heads, as 14 14, and apertures 15 for the passage of a shaft, as 16, which shaft is preferably threaded at its ends and may be provided on each side of each head 14 with any preferred form of lock-nuts, as 17, whereby the said shaft 16 is prevented from having longitudinal movement and is at the same time free for rotation. Pivotally carried by each of the free ends of shaft 16 are suitable vertical standards, as 18 18, which are shouldered at their upper ends and threaded to receive nuts, as 19 19. A suitable rearwardly-extending yoke 20 is preferably formed with a suitable aperture upon each side for registering with the threaded ends of the reduced portions of standards 18, whereby in operation when said nuts 19 are in position they will serve to rigidly hold the said yoke at right angles to the said standards. The forward portion of the yoke 20 preferably curves and converges in the manner best seen in Fig. 2 until it forms a single shaft, as 21, and is provided with carrying-casters 22 22 and suitable draft mechanism, as 23. The yoke proper extends to the rear of the axle 1 and may be formed of any desired detail of contour and is adapted to carry beneath it a suitable double screen, as will be hereinafter more fully described.

The lower ends of the standards 18 are adapted to carry plows, as 24 24, the said plows being so arranged that their landsides are adapted to face the wheels 2 2, while their moldboards face each other, whereby in operation the two streams of dirt thrown by the said plows will be directed rearwardly and toward each other.

As before mentioned, a suitable screen, as 25, is suspended from the rearwardly-extending yoke 20 by means of suitable links 26 26 and bifurcated arms 27 27. Each of the links 26 is preferably composed of an upper member provided with a bifurcated head and a screw-threaded shank and a lower member pivoted between the bifurcations of said head at its upper end and to a portion of the screen at its lower end, the said threaded shank of the upper member being passed through an aperture in yoke 20 and held in position by a suitable nut. The bifurcated arm 27 is provided with a main vertical member 27', which is threaded at its upper end, extends through an aperture in yoke 20, and is adapted to receive a nut for retaining the same in position. The other arm of the bifurcation extends at an acute angle to the main vertical member 27' and is adapted to enter an aperture, as at 28, which extends partially through the yoke 20, whereby the said arm 27 is prevented from rotating. The lower end of said arm is provided with a suitable eye, which eye is preferably engaged by any preferred form of ring or link, as 29, the said link also passing through a suitable eye, as 30, formed upon or carried by screen 25. The said screen 25 is preferably composed of a plurality of rods suitably spaced apart for performing functions hereinafter set forth. A curved binding-strip, as 31, is secured to the said rods near their forward ends for holding them in position, and a similar strip, as 32, secured to a portion of the said rods near their rear ends. A strip, as 33, formed with a compound curve providing a central arch 34, is also secured near the rear end of the said screen and preferably immediately above strip 32 and carries the remaining number of the said rods, whereby a double screen is provided, which is complete in its duplicity, especially at the rear end. Near one side of screen 25 is secured a suitable deflecting-board, as 35, which may be of any preferred form, particularly that best seen in Fig. 5 of the drawings.

In order that the plows and screen may be brought into or moved from operative position, it is contemplated to provide a suitable lever, as 36, which is bent approximately at a right angle near its lower end and is formed integral with or rigidly fixed to shaft 12, near one end thereof, whereby by manipulation of the said lever the said shaft may be rotated. Any suitable rack, as 37, may be provided to be engaged by a vertically-operable pin, as 38, carried by lever 36 and controlled by any suitable operating mechanism whereby the said lever may be locked at any desired point. It will of course be seen that the rotation of shaft 12 will necessarily either lower or elevate the lower ends of arms 13 13, and thereby alter the position of plows 24 and screen 25, so that by an adjustment of lever 36 the said plows may be caused to cut the desired depth of furrow or may be lifted entirely out of operating position.

A suitable stirrer, as 39, is adapted to be carried centrally of one of the upper portions of screen 25 and far enough above the rods of said screen not to engage the same, but to affect material passing over that portion of the said screen. The said stirrer is preferably carried at the lower end of a rotatable vertical shaft, as 40, which shaft is preferably incased by a suitable tube, as 41, and is provided at its upper end with a suitable beveled gear, as 42. The casing 41 is supported at its lower end by a suitable stay 43, which is preferably secured at its opposite end to axle 1. The upper end of the casing 41 is supported by a rigid arm, as 44, extending from and secured to the said axle 1. This arm 44 is preferably bifurcated at its outer end, as best seen in Fig. 6, its upper portion forming a bearing for the upper end of shaft 40. A beveled gear-wheel, as 45, is adapted to have its teeth mesh with those of gear 42 for rotating the said stirrer. The said wheel 45 is carried at the end of a suitable operating-shaft 46, which shaft finds bearing near its inner end in a sleeve, as 47, carried at the outer end of a suitable arm 48, secured to axle 1. The outer end of shaft 46 preferably carries a gear-wheel, as 49, adapted to mesh with suitable gearing, as 50, carried by the hub of one of the wheels 2. In operation the gear-wheel 49 will of course continue its engagement with gear 50; but should it be desired to stop the operation of stirrer 39 the said gears will be thrown out of mesh. To accomplish this, I provide a suitable curved arm, as 51, which is formed at one end with a shouldered portion 52, provided with an integral bolt 53, adapted to extend through axle 1 and have threaded on its outer end a suitable nut, as 54, for retaining the said arm in position. The arm preferably extends rearwardly for a suitable distance, is curved upon itself, passed beneath axle 1, bent into an approximate loop, and has its free end provided with an aperture, passed over bolt 53, and securely held by nut 54. At suitable points intermediate of the length of the rearwardly-extending portion of said arm 51 are provided elongated slots 55 and 56, through which extend suitable bolts, as 57 and 58, which bolts are provided at their upper ends with nuts larger than the width of their respective slots and at their lower ends with a slidable plate, as 59. The plate 59 is provided with a suitable sleeve, as 60, which is adapted to form a bearing for the outer end of shaft 46. The nut carried by bolt 58 is preferably provided with a suitable ring 61, adapted to be engaged by a spring-rod 62, which rod in turn engages a lever 63. The lever 63 is pivoted, as at 64, in any suitable manner to a portion of arm 51 and is provided with suitable means for engaging apertures, as 65, in the said arm, whereby the said lever may be adjusted longitudinally of the upper face of the forward portion of the arm, thereby throwing the said gear 49 into or out of mesh with gear 50.

From the foregoing description it will be seen that all that is necessary to place the present potato-digger into operative position from the position shown in dotted lines in Fig. 1 will be to throw lever 38 forward for any desired distance, and when desired to attain the greatest depth of furrow said lever may be entirely freed from engagement with rack 37. The earth thrown rearwardly by the facing moldboards of the plows will of course be directed to and fall upon screen 25, the forward ends of the rods comprising said screen extending back of the rear ends of the said moldboards and the lowest ones being on a level with the lower edge of each of the plowshares. When the dirt, together with the potato-vines and other trash, is thrown upon screen 25, it will immediately be engaged by the rotating stirrer 39, and the soil will be broken into fine particles, immediately falling through the said screen, while the vines and other trash will pass out at the rear of the said screen on each side of arch 34, the potatoes falling below the arch upon the second or lower portion of the said screen and passing out of the rear thereof at the center of the screen, so that after the present potato-digger has passed across the field it will leave behind it a row of vines and other trash on each side of a central row of potatoes, whereby potato-digging is greatly facilitated. Of course a receptacle might be placed at the rear central portion of screen 25 for the reception of the potatoes, if desired; but such is not necessary to the successful operation of the present invention.

Although the present invention has been particularly described as specifically embodied in the accompanying drawings, yet it will be understood that I shall feel at liberty to deviate from the particular size, shape, and minor details of the parts within the spirit and scope of my invention.

As before described, in order to stop the operation of stirrer 39 gear-wheel 49 must be thrown out of mesh with gear 50, and in so doing shaft 46 must be free to have at least a slight lateral movement throughout its entire length. In order to permit this movement and still retain its journal-bearing within sleeve 47, the said shaft 46 is made of slightly less diameter than the said sleeve.

Having thus fully described my invention, what I claim as new, and desire to secure by Letters Patent, is—

1. In a potato-digger, the combination with a suitable axle carried by traction-wheels, of a shaft spaced from said axle, arms depending from said shaft, a yoke pivotally secured to said arms, means for rotating said shaft for raising and lowering said yoke, a plow carried by said yoke, and a screen also carried by the yoke, substantially as described.

2. In a potato-digger, the combination with an axle and suitable traction-wheels supporting the same, of a pivoted shaft supported by the said axle, arms extending from the said shaft, a yoke pivotally secured to the said arms, plows carried by the said yoke, a double screen supported by the said yoke and carried at the rear of said plows, and means for rotating said shaft whereby said plows and screens may be raised or lowered, substantially as described.

3. In a potato-digger, the combination with a suitable axle and traction-wheels supporting the same, of sleeves carried beneath the said axle, a shaft whose ends find bearings in such sleeves, an arm extending from said shaft, a plow pivotally supported by said arm, a screen at the rear of said plow, and means for rotating said shaft whereby the plow may be raised or lowered, substantially as described.

4. In a potato-digger, the combination with traction-wheels carrying a suitable axle, of bolts passed vertically through said axle and rigidly secured in position, the heads of said bolts being provided with apertures, a shaft finding bearings in the apertures of said heads, an arm extending from said shaft and rigidly secured thereto, a plow pivotally carried by said arm, a screen carried at the rear of said plow, a lever rigidly secured to said shaft and adapted, when moved forwardly or rearwardly to rotate said shaft, and means for locking said lever in any given position, whereby the plow may be held at any desired altitude with respect to said axle, substantially as described.

5. A potato-digger, comprising in its construction a suitable frame, plows carried thereby, the moldboards of said plows facing each other, and a screen at the rear of said moldboards for receiving the soil thrown rearwardly thereby, the said screen comprising a plurality of spaced bars, a curved binding-strip secured to all of said bars near the front ends thereof, a similar strip secured to a portion of the said bars near the rear ends thereof, and a strip above said rear strip provided with a central arch and secured to the remaining portion of said bars, substantially as described.

6. A potato-digger, comprising in its construction a suitable frame, a yoke pivotally carried thereby, plows rigidly carried by said yoke, a double screen carried at the rear of said plows, a deflector-board carried by one side of said screen, and means for securing said screen to said yoke, comprising links at the rear of the screen and pivoted thereto and provided with bolts adapted to pass through the said yoke and receive securing-nuts, the said bolts being provided with bifurcated heads for receiving the free ends of said links, and bifurcated arms pivotally secured to the forward portion of said screen, each of said arms comprising a vertical bolt passed through an aperture in said yoke and a member extending at an acute angle therefrom and having its free end extending into an aperture in the yoke, substantially as described.

7. In a potato-digger, the combination with a suitable axle and wheels supporting the same, of a shaft extending parallel therewith and spaced therefrom, means for rotatably supporting the said shaft, arms rigidly secured to and extending from said shaft, eyes formed on the free ends of said arms, a shaft passed through said eyes, standards pivotally supported by said last-mentioned shaft, a yoke carried by said standards, plows carried at the lower ends of said standards, and a screen carried by said yoke at the rear of said plows, substantially as described.

8. In a potato-digger, the combination with a suitable axle, wheels supporting the same, and draft appliance carried thereby, of a rotatable shaft supported beneath said axle, arms extending from said shaft, eyes formed at the free ends of said arms, a shaft extending through said eyes and formed with screw-threads, a nut threaded upon the said shaft at each side of one of said eyes, whereby the said shaft is locked against longitudinal movement, a yoke pivotally supported by said last-mentioned shaft, plows carried thereby and a screen carried at the rear of said plows, substantially as described.

9. In a potato-digger, the combination with a suitable frame, draft appliance, plows carried by said frame, the moldboards of said plows facing each other and a double screen at the rear thereof, whereby the soil thrown by said plows is adapted to be directed over the said screen, of means for breaking the soil into small particles, comprising a horizontally-rotatable stirrer, a shaft carried thereby, a gear-wheel carried by said shaft, a gear-wheel carried by a second shaft and meshing with the first-mentioned gear-wheel, means for rotating the second shaft, and means for preventing the rotation thereof, substantially as described.

10. In a potato-digger the combination with an axle and suitable traction-wheels supporting the same, of a pivoted shaft supported by said axle, arms extending from said shaft, a yoke pivotally secured to said arms, plows carried by said yoke, and means for rotating said shaft, whereby said plows may be raised or lowered, substantially as described.

11. In a potato-digger, the combination with traction-wheels carrying a suitable axle, of bolts passed vertically through said axle and rigidly secured in position, the heads of said bolts being provided with apertures, a shaft finding bearings in the apertures of said heads, an arm rigidly secured to and extending from said shaft, a plow pivotally carried by said arm, and means for rotating said shaft, whereby the plow may be lifted to any desired altitude with respect to said axle, substantially as described.

12. In a potato-digger the combination with a suitable frame, and potato-unearthing means carried by the frame, of a screen at the rear of said means for receiving the soil thrown rearwardly thereby, said screen comprising a plurality of space-bars, a curved binding-strip secured to all of said bars near one end thereof, and a similar strip secured to a portion of the said bars near the opposite end thereof, and a strip above said latter strip provided with a central arch and secured to the remaining portion of said bars, substantially as described.

13. A potato-digger comprising a suitable frame, a yoke pivotally carried thereby, plows rigidly carried by said yoke, a double screen carried at the rear of said plows, a deflector-board carried by one of said screens, and means for securing said screen to said yoke, substantially as described.

14. In a potato-digger the combination with a suitable axle, wheels supporting the same, and a draft appliance carried thereby, of a rotatable shaft supported beneath said axle, arms extending from said shaft, eyes formed at the free ends of said arms, a screw-threaded shaft extending through said eyes, a nut threaded upon said shaft at each side of each of said eyes, a yoke pivotally supported by said last-mentioned shaft, and plows carried by said yoke, substantially as described.

15. In a potato-digger, the combination with a suitable axle, and wheels supporting the same, of a rotatable shaft supported beneath said axle, arms extending from said shaft, eyes formed on the free ends of said arms, a screw-threaded shaft extending through said eyes, a nut threaded upon the said shaft on the inside of each of said eyes, a yoke pivotally supported by said last-mentioned shaft, and plows carried thereby, substantially as described.

In testimony whereof I hereunto affix my signature in presence of two witnesses.

ROBERT J. THOMPSON.

Witnesses:
L. M. CRONK,
J. B. CARPENTER.